United States Patent
Lapilli et al.

(10) Patent No.: US 8,456,953 B2
(45) Date of Patent: Jun. 4, 2013

(54) WAVE EQUATION ILLUMINATION

(75) Inventors: Cintia Lapilli, Houston, TX (US);
David Nichols, Houston, TX (US);
Alfonso Gonzalez, Sugar Land, TX (US)

(73) Assignee: WesternGeco L.L.C., Houston, TX (US)

( * ) Notice: Subject to any disclaimer, the term of this patent is extended or adjusted under 35 U.S.C. 154(b) by 643 days.

(21) Appl. No.: 12/688,972

(22) Filed: Jan. 18, 2010

(65) Prior Publication Data

US 2011/0176386 A1 Jul. 21, 2011

(51) Int. Cl.
*G01V 1/00* (2006.01)

(52) U.S. Cl.
USPC .......................................................... 367/73

(58) Field of Classification Search
USPC ............................................. 367/73; 702/16
See application file for complete search history.

(56) References Cited

U.S. PATENT DOCUMENTS 4,800,539 A * 1/1989 Corn et al. ...................... 367/72
7,609,585 B2 * 10/2009 Jiao et al. ......................... 367/50

OTHER PUBLICATIONS van Veldhuizen, "Acquisition geometry analysis in complex 3D media", Geophysics, vol. 73, No. 5 (Sep.-Oct. 2008).*
Chen, "Target-oriented beamlet migration based on Gabor-Daubechies frame decomposition", Geophysics, vol. 71, No. 2 (Mar.-Apr. 2006).*
van Veldhuizen, "Acquisition geometry analysis in complex #D media", Geophysics, vol. 73, No. 5 (Sep.-Oct. 2008).*
Cao, et al., Full-Wave Directional Illumination Analysis in the Frequency Domain, Geophysics, Jul.-Aug. 2009, p. S85-S93, vol. 74, No. 4.
Chen, et al., Target-Oriented Beamlet Migration Based on Gabor-Daubechies Frame Decomposition, Geophysics, Mar.-Apr. 2006, p. S37-S52, vol. 71, No. 2.
Lecomte, Resolution and Illumination Analyses in PSDM: A Ray-Based Approach, The Leading Edge, May 2008, p. 650-663.
Veldhuizen, et al., Acquisition Geometry Analysis in Complex 3D Media, Geophysics, Sep.-Oct. 2008, p. Q43-Q58, vol. 73, No. 5.
Xie, et al., Three-Dimensional Illumination Analysis Using Wave Equation Based Propagator, SEG, 2003, p. 989.

* cited by examiner

*Primary Examiner* — Isam Alsomiri
*Assistant Examiner* — Krystine Breier

(57) ABSTRACT

A method for generating an illumination map. The method includes receiving an earth model that represents one or more properties of the earth. The method then includes receiving a target area in the earth model and propagating one or more wavefields from the target area to a potential seismic data acquisition region in the earth model. After propagating the wavefields, the method includes decomposing the propagated wavefields into one or more subsets of the propagated wavefields and creating the illumination map based on the subsets of the propagated wavefields. The illumination map may indicate one or more contributions of one or more synthetic source and receiver pairs for illuminating the target area in the earth model. The method may then include creating a seismic survey design based on the contributions.

25 Claims, 4 Drawing Sheets

WAVE EQUATION ILLUMINATION

BACKGROUND

1. Field of the Invention

Implementations of various technologies described herein generally relate to seismic data processing.

2. Description of the Related Art

The following descriptions and examples are not admitted to be prior art by virtue of their inclusion within this section.

Seismic exploration is widely used to locate and/or survey subterranean geological formations for hydrocarbon deposits. Since many commercially valuable hydrocarbon deposits are located beneath areas of land and bodies of water, various types of land and marine seismic surveys have been developed.

In a typical land or marine seismic survey, seismic sensors are installed in specific locations around an area of the earth in which hydrocarbon deposits may exist. Seismic sources, such as vibrators or air guns, may move across the area and produce acoustic signals, commonly referred to as "shots," directed down to the earth, where they are reflected from the various subterranean geological formations. Reflected signals are received by the sensors, digitized, and then transmitted to a survey database. The digitized signals are referred to as seismic data. The ultimate aim of this process is to build a representation of the subterranean geological formations beneath the surface of the earth. Analysis of the representation may indicate probable locations of hydrocarbon deposits in the subterranean geological formations.

Prior to installing seismic sensors and receivers in specific locations around an area of the earth, computers may be used to model how seismic sensors and receivers may react in certain areas of the earth. The models created by the computers may create an illumination map which may be used to determine where the seismic sensors and receivers should be installed. The illumination map may quantify how effective the earth is in propagating energy to and from a target area of the earth. The target area of the earth may represent an area of the earth where the subterranean geological formations beneath the surface of the earth are located. In order to create an illumination map, the computers may be used to perform numerical simulations of wavefield propagations on an earth model. In these simulations, source and receiver configurations are placed on the earth model in locations that represent the surface of the earth, the surface of a body of water on the earth, the seabed on the earth or a borehole in the earth. One method of numerical wave propagation that is commonly used is ray-tracing.

Ray-tracing is implemented by propagating rays from potential source locations in the earth model to the target areas in the earth model. The target areas may link the potential source locations with the subterranean geological formations inside the earth. For example, the target area may include a reflector near a potential hydrocarbon reservoir. The target area may also include receiver locations where reflections may be recorded. The ray-tracing method is typically computationally efficient, but it may fail in areas where complex variations exist near the target area. Complex variation may include the presence of salt bodies, carbonates, basalts, shale diapirs or other geologic situations that create complexity.

SUMMARY

Described herein are implementations of various technologies for creating an illumination map using wave equations. In one implementation, a method for creating an illumination map using wave equations may include receiving an earth model that represents one or more properties of the earth. The method may then include receiving a target area in the earth model and propagating one or more wavefields from the target area to a potential seismic data acquisition region in the earth model. After propagating the wavefields, the method may include decomposing the propagated wavefields into one or more subsets of the propagated wavefields. The method may then include creating the illumination map based on the subsets of the propagated wavefields. In one implementation, the illumination map may indicate one or more contributions of one or more synthetic source and receiver pairs for illuminating the target area in the earth model. The method may then include creating a seismic survey design based on the illumination contributions.

In another implementation, a computer application may receive an earth model representing one or more properties of the earth, receive a target area in the earth model and propagate one or more wavefields from a potential seismic data acquisition region in the earth model to the target area. After propagating the wavefields from the potential seismic data acquisition region to the target area, the computer application may decompose the propagated wavefields into one or more subsets of the propagated wavefields. The computer application may then create an illumination map based on the subsets of the propagated wavefields, wherein the illumination map indicates one or more contributions of one or more synthetic source and receiver pairs for illuminating the target area in the earth model. After creating the illumination map, the computer application may create a seismic survey design based on the contributions.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs provide a brief description of one or more implementations of various technologies and techniques directed at creating an illumination map using wave equations.

In one implementation, a method for creating an illumination map using wave equations may be performed by a computer application. Initially, the computer application may receive an earth model from a user. The earth model may represent various seismic properties of the earth. The computer application may then receive a target area from the user. The target area may indicate a general vicinity, a point, a horizon or a region in the subsurface of the earth that may be of interest to the user.

The computer application may then propagate a wavefield in the earth model from a point on the earth model representing the target area. In one implementation, the wavefield may be propagated outward in all directions. After propagating the wavefield in the earth model, the computer application may decompose the propagated wavefield into two or more subsets of the propagated wavefield. In one implementation, the computer application may decompose the propagated wavefield based on the direction in which the wavefield departs from the target area and the location of the target area on the earth model. The computer application may then create an illumination map based on the subsets of the propagated wavefield. The computer application may use the illumination map to quantify how well the target area may be illuminated.

Various techniques for creating an illumination map using wave equations will now be described in more detail with reference to FIGS. 1-4 in the following paragraphs.

Figure 1:
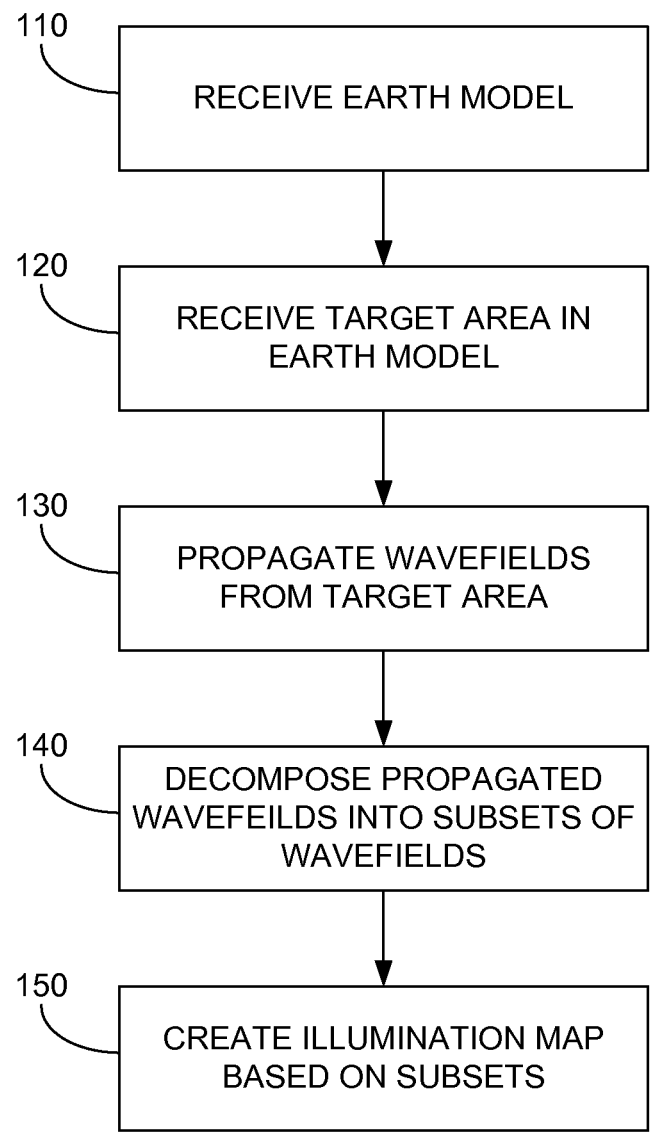
FIG. 1 illustrates a flow diagram of a method for creating an illumination map using wave equations in accordance with implementations of various techniques described herein.

FIG. 1 illustrates a flow diagram of a method for creating an illumination map using wave equations in accordance with implementations of various techniques described herein. In one implementation, the method for creating an illumination map using wave equations may be performed by a computer application. It should be understood that while the flow diagram 100 indicates a particular order of execution of the operations, in some implementations, certain portions of the operations might be executed in a different order.

At step 110, the computer application may receive an earth model. The earth model may represent the various properties of the earth including elastic properties of the earth, such as anisotropic velocity, density, attenuation or other similar attributes.

At step 120, the computer application may receive a target area in the earth model. The target area may indicate a general vicinity, a point, a horizon or a region of interest in the subsurface of the earth. In one implementation, the target area may designate an area on the earth where hydrocarbon deposits may exist inside the earth's surface.

At step 130, the computer application may propagate one or more wavefields in the earth model. In one implementation, the computer application may propagate the wavefields outward from the target area. In this manner, the wavefields may propagate from the target area to a potential acquisition region. The potential acquisition region may include any location on the earth model that may receive the propagated wavefields. The received propagated wavefields may be referred to as synthetic seismic data. In one implementation, the potential acquisition region may include a region on the earth model where synthetic receivers may be installed, such as on a surface of the earth, in boreholes, on a seabed or the like. Although the wavefields are described as being propagated to one potential acquisition region, it should be noted that in other implementations, the wavefields may be propagated towards more than one potential acquisition regions.

The computer application may propagate the wavefield using a forward modeling technique. The forward modeling technique may propagate the wavefields from one or more synthetic sources located at the target area in the earth model to one or more synthetic receivers in the potential acquisition region. When propagating wavefields, the computer application may simulate a wavefield that may be created from the synthetic sources in the target area. As such, the computer application may determine how the wavefield may propagate through the earth model from the target area. The computer application may determine the changes that may occur to the propagated wavefields as it travels through various parts of the earth model that have various attributes. The wavefield propagation may be done using one-way or two-way wave equations. Wave equations may be acoustic, elastic, visco-acoustic or visco-elastic. Methods to solve the wave equation may include finite difference, finite element, spectral, pseudo spectral, phase shift methods and the like. The propagated wavefields may be used to model acoustic, elastic, attenuation and other wave propagation effects on the earth model. In one implementation, the propagated wavefields may represent energy produced from a seismic source, such as a shot.

After propagating the wavefields, the computer application may then determine the seismic data (e.g., synthetic seismic data) that the synthetic receivers in the potential acquisition region may receive due to the propagated wavefields. The synthetic seismic data may represent the propagated wavefields received by the synthetic receivers after the wavefields were propagated from the synthetic source located at the target area through the earth model to the synthetic receivers located at the potential acquisition regions. In addition to being located in the potential acquisition region, the synthetic receivers may be located anywhere on the earth model such that the computer application may determine the synthetic seismic data at various locations on the earth model.

In another implementation, the computer application may propagate the wavefields from one or more synthetic sources located at the potential acquisition region in the earth model to one or more synthetic receivers in the target area. Here, the computer application may then simulate the seismic data (e.g., synthetic seismic data) that the synthetic receivers in the target area may receive from the propagated wavefields that originated at the potential acquisition region. In this implementation, the synthetic seismic data may represent the propagated wavefields received by the synthetic receivers after the wavefields were propagated from the synthetic sources located at the potential acquisition region through the earth model to the synthetic receivers located at the target area.

Figure 2A:
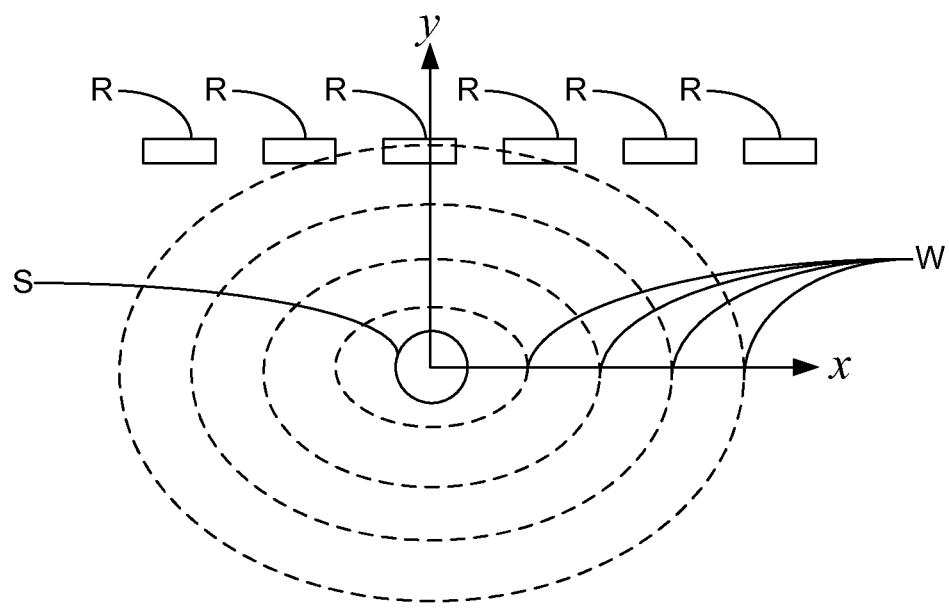
FIG. 2A illustrates a schematic diagram of a propagating wavefield in accordance with one or more implementations of various techniques described herein.

Depending on where the target area, the potential acquisition regions, the synthetic sources and the synthetic receivers are located on the earth model, the computer application may propagate the wavefields predominantly upwards, downwards or sideways. For example, if the synthetic sources are located in the target area, the synthetic receivers are located in the potential acquisition region and the target area is located below the potential acquisition regions, the computer application may propagate the wavefield upward from the target area to the potential acquisition region. An example of a propagating wavefield is illustrated in FIG. 2A.

At step 140, the computer application may decompose the propagated wavefields into subsets of the propagated wavefields. In one implementation, the computer application may decompose the synthetic seismic data that have been received at the synthetic receivers. The synthetic seismic data may include the propagated wavefield arrivals from all possible directions. Decomposing the synthetic seismic data may include separating the synthetic seismic data with respect to a particular direction into subsets of the synthetic seismic data. For example, the direction may include a take-off direction of the propagated wavefield at the synthetic source, an arrival direction of the propagated wavefield at the synthetic receiver, a reflection angle and azimuth at the target area or the like. In one implementation, the direction may be defined in terms of local dip and azimuth of a reflector in the target area and angles of incident for the propagated wavefields reflected at the reflector. However, it should be noted that the direction may be defined using any term that describes the direction in which the wavefields are travelling to and/or the direction from which the wavefields are produced.

In one implementation, the computer application may decompose the synthetic seismic data using a Gabor decomposition technique. The Gabor decomposition technique may separate the propagated wavefields into subsets of the propagated wavefields such as "Gabor modes" or "beamlets". A Gabor mode may correspond to a directional vector associated with a vicinity around a point in the target area and a set of points at the potential acquisition region.

In previous methods for creating an illumination map, wavefields are separated according to a predefined direction before they are propagated. While this approach may preserve directional information pertaining to the synthetic seismic data, it may be costly because each direction of the wavefield has to be propagated separately at a high computational cost. Further, separating the wavefield before they are propagated limits the information available from the wavefields because the direction needs to be predefined. Conversely, method 100 described herein propagates the wavefield in all directions simultaneously and subsequently decomposes the propagated wavefield.

Figure 2B:
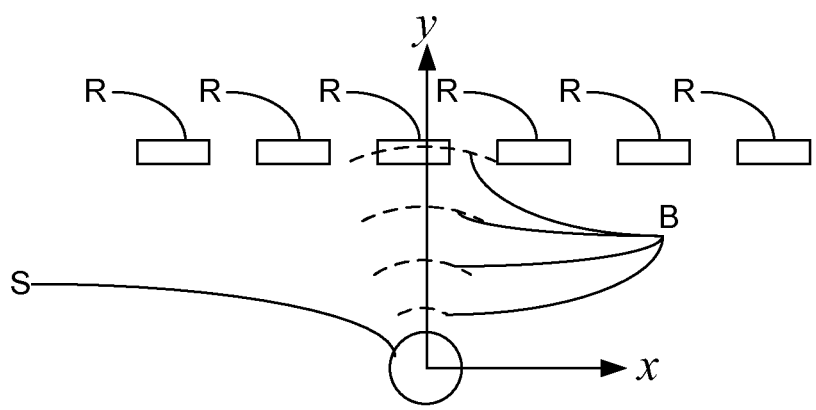
FIG. 2B illustrates a schematic diagram of a subset of a propagated wavefield in accordance with one or more implementations of various techniques described herein.

The subsets of the synthetic seismic data (e.g., subsets of the propagated wavefield) produced at step 140 may have attributes, such as amplitude and energy of the synthetic seismic data. These attributes may quantify effectiveness of the corresponding target area of the earth with respect to propagating wavefields, or energy, to and from the target area. For instance, the attributes may define what directions of the wavefield propagation may carry energy, how much energy each direction of the wavefield propagation may carry, in what directions of the propagation wavefield is energy lost, in what directions of the propagation wavefield does energy fail to reach the target area, and the like. An example of a subset of the propagated wavefield is illustrated in FIG. 2B.

At step 150, the computer application may create an illumination map based on the subsets of the synthetic seismic data determined at step 140. In one implementation, when the target is a volume of interest in the subsurface, the computer application may also create a map representing illumination attributes of reflectors inside the volume of the target area's subsurface. The illumination map may include attributes that are used for creating a seismic survey design or for seismic data processing and imaging. The illumination map may be created for specific directions based on the subsets of the synthetic seismic data in the same direction. In one implementation, the illumination map may be used to analyze illumination for a particular set of directional parameters, such as a fixed aperture and azimuth angle of reflection at the target area. In another implementation, the illumination map may be used to analyze all of the directional parameters in order to determine the total illumination for all angles of reflection at the target area. In this manner, the illumination map may represent the synthetic seismic data as a function of structure, aperture angle or the like.

Figure 3A:
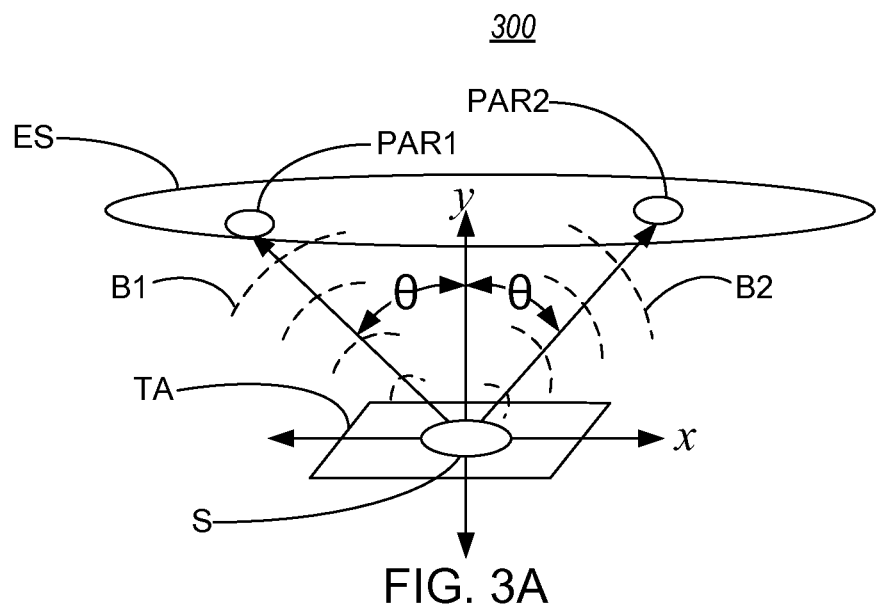
FIG. 3A illustrates a schematic diagram of two subsets of a propagated wavefield in accordance with one or more implementations of various techniques described herein.
Figure 3B:
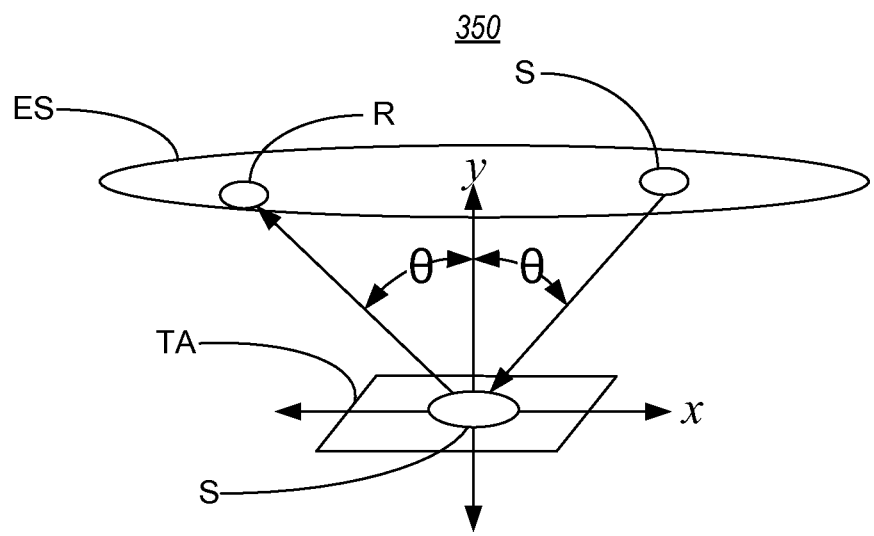
FIG. 3B illustrates a schematic diagram of a potential source and receiver pair in accordance with one or more implementations of various techniques described herein.

After creating the illumination map, the computer application may use the illumination map to determine how well the target area may be illuminated. In one implementation, the computer application may determine where actual sources and actual receivers should be placed in a survey area in order to effectively illuminate the target area. The placement of sources and receivers determined by the computer application may be used to design a survey for the target area. An example of using the illumination map to determine the placement of sources and receivers is illustrated in FIGS. 3A-3B.

In another implementation, the computer application may use the illumination map to identify which source and receiver pairs in the earth model may best illuminate the target area. The source and receiver pairs that provide the best illumination for the target area may then be selected and used to obtain images of the target area. In yet another implementation, the computer application may use the illumination map to determine other factors such as the illumination energy as a function of direction. By defining the illumination energy as a function of direction, the computer application may identify the contributions of each source and receiver pair in the earth model. The contributions of each source and receiver pair may then be used to maximize the use of the sources and receivers that contribute the most to illuminating the target area. The computer application may also use the illumination function to normalize the seismic images acquired from the synthetic seismic receivers or actual seismic receivers to compensate for certain illumination effects.

FIG. 2A illustrates a schematic diagram of a propagating wavefield in accordance with one or more implementations of various techniques described herein. The following description of schematic diagram 200 is made with reference to step 130 in the method 100 of FIG. 1 in accordance with one or more implementations of various techniques described herein. The schematic diagram 200 includes a source S, wavefields W and receivers R.

In one implementation, the source S may represent the synthetic sources described in method 100, and the receivers R may represent the synthetic receivers described in method 100. The source S and the receivers R may be may be positioned in the target area or the potential acquisition regions as described in FIG. 1. As shown in FIG. 2A, the wavefields W may propagate outward from the source S in all directions.

FIG. 2B illustrates a schematic diagram of a subset of a propagated wavefield in accordance with one or more implementations of various techniques described herein. The following description of schematic diagram 250 is made with reference to step 140 in method 100 of FIG. 1 and schematic diagram 200 of FIG. 2A in accordance with one or more implementations of various techniques described herein. The schematic diagram 250 includes a source S, a beamlet B and receivers R.

In one implementation, the beamlet B represents a subset of the propagated wavefield determined at step 140. As shown in FIG. 2B, the beamlet B is a subset of the wavefields W in FIG. 2A. The beamlet B illustrates a subset of the wavefields W that is separated based on its direction. The beamlet B includes the wavefields W that are propagated out in the y-axis direction.

FIG. 3A illustrates a schematic diagram of two subsets of a propagated wavefield in accordance with one or more implementations of various techniques described herein. The following description of schematic diagram 300 is made with reference to step 140 in method 100 of FIG. 1 and schematic diagram 200 of FIG. 2A. Schematic diagram 300 includes an earth surface ES, a potential acquisition region PAR1, a potential acquisition region PAR2, a beamlet B1, a beamlet B2, an angle θ and a target area TA.

Potential acquisition region PAR1 and potential acquisition region PAR2 represent regions where seismic sources and seismic detectors are positioned during acquisition of seismic data in a seismic survey. These seismic sources may be acoustic or multi-component. Seismic detectors may include land geophones, marine pressure phones, marine velocity detectors, ocean-bottom pressure phones, ocean bottom velocity detectors, multi-component borehole detectors, ultra-sonic detectors and the like.

The earth surface ES may represent the surface of the earth, a borehole, a seabed or anywhere on the earth where potential acquisition regions PAR1 and PAR2 may exist. The beamlets B1 and B2 may be subsets of the wavefields W as described in FIG. 2A. The beamlet B1 and the beamlet B2 are both separated from the vertical y-axis by the angle θ. The target area TA may represent the target area as described in FIG. 1. In the example provided here in FIG. 3A, the target area TA is parallel with the x-axis. As such, the y-axis is perpendicular or normal to the target area TA. However, it should be noted that the target area TA may have any orientation with respect to the coordinate frame. In one implementation, the computer application described in the FIG. 1 may use the illumination map to identify the beamlets B1 and B2 from the wavefield W because they may indicate how a source and receiver pair may illuminate the target area TA. If the illumination map indicates that a source and receiver pair located at the potential acquisition regions PAR1 and PAR2 provides a high contribution to the illumination of the target area TA, the computer application may determine that the potential acquisition regions PAR1 and PAR2 may be used as locations on the earth for the source and receiver pair, as indicated in FIG. 3B.

FIG. 3B illustrates a schematic diagram of a potential source and receiver in accordance with one or more implementations of various techniques described herein. The following description of schematic diagram 350 is made with reference to method 100 of FIG. 1 and the schematic diagram 300 of FIG. 3A. Schematic diagram 350 includes an earth surface ES, a source S, a receiver R, an angle θ and a target area TA.

In one implementation, the computer application described in the method 100 may evaluate the illumination map and the beamlets B1 and B2 described in FIG. 3A to determine that the source S may be positioned at the potential acquisition region PAR2 and the receiver R may be positioned at the potential acquisition region PAR1 in order to illuminate the target area TA. The computer application may determine the positions of the source S and the receiver R using the reciprocity principle. By reciprocity, the computer application may determine that the potential acquisition regions PAR1 and PAR2 in FIG. 3A may correspond to source S and receiver R locations because a wavefield propagated from the source S may reflect off of the target area TA and the reflected wavefield may then project toward the receiver R. The computer may perform similar analysis to determine the locations of sources and receivers in a survey design. Although the source S has been described as being placed in the potential acquisition region PAR2 and the receiver R has been described as being placed in the potential acquisition region PAR1, it should be noted that computer application may have placed the source S in the potential acquisition region PAR1 and the receiver R may have been placed in the potential acquisition region PAR2.

The schematic diagrams illustrated in FIGS. 2A, 2B, 3A and 3B are provided to demonstrate various applications of how the wavefield may be propagated, decomposed or used by the computer application as described in the method 100. It should be noted that these illustrations are merely included to provide examples of how the method 100 may be used. These illustrations are not meant to limit the applications of the method 100.

Figure 4:
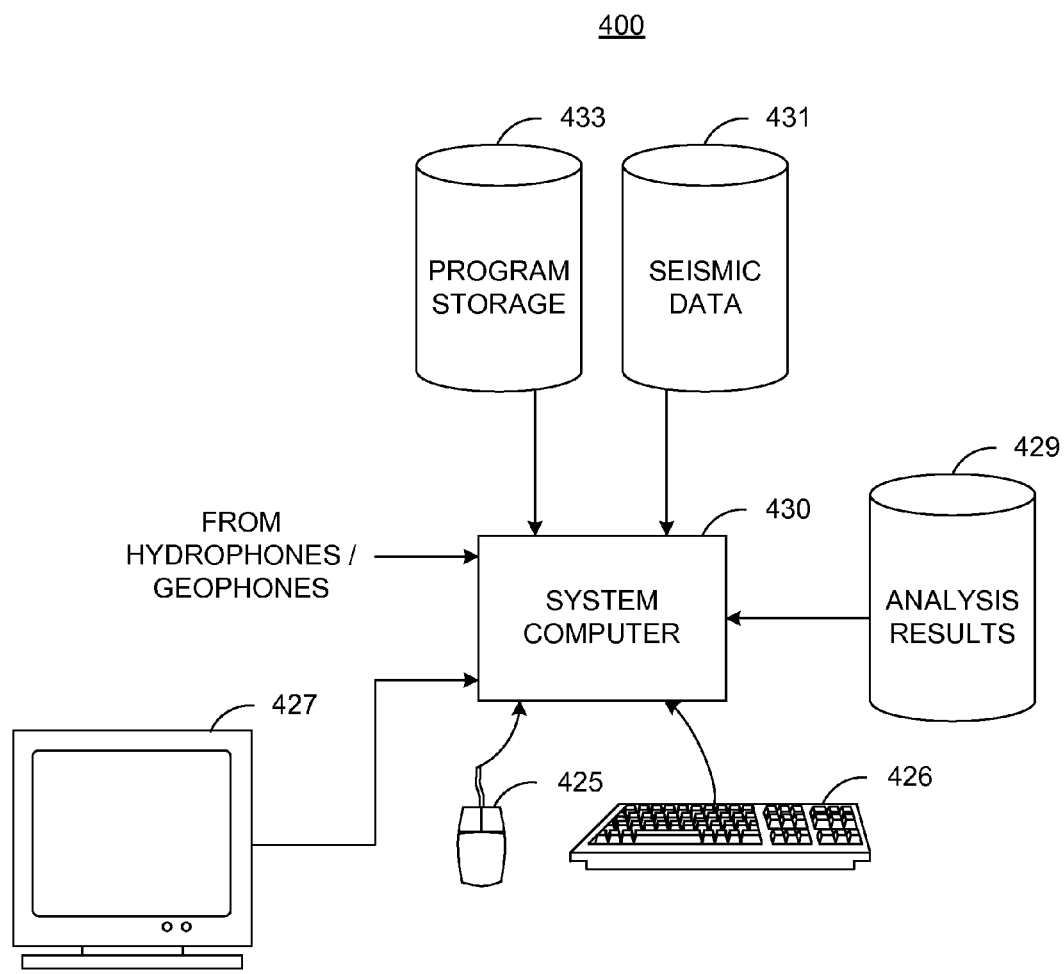
FIG. 4 illustrates a computer network into which implementations of various technologies described herein may be implemented.

FIG. 4 illustrates a computer network 400 into which implementations of various technologies described herein may be implemented. In one implementation, various techniques for creating an illumination map using wave equations as described in FIG. 1 may be performed on the computer network 400. The computer network 400 may include a system computer 430, which may be implemented as any conventional personal computer or server. However, it should be understood that implementations of various technologies described herein may be practiced in other computer system configurations, including hypertext transfer protocol (HTTP) servers, hand-held devices, multiprocessor systems, microprocessor-based or programmable consumer electronics, network PCs, minicomputers, mainframe computers, high-performance clusters of computers, co-processing-based systems (GPUs, FPGAs) and the like. In one implementation, the computer application described in the method 100 may be stored on the system computer 430.

The system computer 430 may be in communication with disk storage devices 429, 431, and 433, which may be external hard disk storage devices. It is contemplated that disk storage devices 429, 431, and 433 are conventional hard disk drives, and as such, will be implemented by way of a local area network or by remote access. Of course, while disk storage devices 429, 431, and 433 are illustrated as separate devices, a single disk storage device may be used to store any and all of the program instructions, measurement data, and results as desired.

In one implementation, seismic data from the receivers may be stored in disk storage device 431. The system computer 430 may retrieve the appropriate data from the disk storage device 431 to process seismic data according to program instructions that correspond to implementations of various technologies described herein. Seismic data may include pressure and particle velocity data. The program instructions may be written in a computer programming language, such as C++, Java and the like. The program instructions may be stored in a computer-readable memory, such as program disk storage device 433. Such computer-readable media may include computer storage media and communication media.

Computer storage media may include volatile and nonvolatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 400.

Communication media may embody computer readable instructions, data structures or other program modules. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 430 may present output primarily onto graphics display 427. The system computer 430 may store the results of the methods described above on disk storage 429, for later use and further analysis. The keyboard 426 and the pointing device (e.g., a mouse, trackball, or the like) 425 may be provided with the system computer 430 to enable interactive operation.

The system computer 430 may be located at a data center remote from the survey region. The system computer 430 may be in communication with the receivers (either directly or via a recording unit, not shown), to receive signals indicative of the reflected seismic energy. After conventional formatting and other initial processing, these signals may be stored by the system computer 430 as digital data in the disk storage 431 for subsequent retrieval and processing in the manner described above. In one implementation, these signals and data may be sent to the system computer 430 directly from sensors, such as geophones, hydrophones and the like. When receiving data directly from the sensors, the system computer 430 may be described as part of an in-field data processing system. In another implementation, the system computer 430 may process seismic data already stored in the disk storage 431. When processing data stored in the disk storage 431, the system computer 430 may be described as part of a remote data processing center, separate from data acquisition. The system computer 430 may be configured to process data as part of the in-field data processing system, the remote data processing system or a combination thereof. While FIG. 4 illustrates the disk storage 431 as directly connected to the system computer 430, it is also contemplated that the disk storage device 431 may be accessible through a local area network or by remote access. Furthermore, while disk storage devices 429, 431 are illustrated as separate devices for storing input seismic data and analysis results, the disk storage devices 429, 431 may be implemented within a single disk drive (either together with or separately from program disk storage device 433), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for generating an illumination map, comprising:
   receiving an earth model representing one or more properties of the earth;
   receiving a target area in the earth model;
   simulating a propagation of one or more wavefields from the target area, using a computer, such that a portion of the propagated wavefields extends to a potential seismic data acquisition region in the earth model;
   decomposing the simulated propagated wavefields into a plurality of beamlets separated according to specific directions;
   creating the illumination map based on one or more of the plurality of beamlets, wherein the illumination map represents attributes of the one or more of the plurality of beamlets; and
   creating a seismic survey design based on the attributes represented in the illumination map.

2. The method of claim 1, wherein the properties of the earth comprise elastic properties of the earth.

3. The method of claim 2, wherein the elastic properties of the earth comprise anisotropic velocity, density, attenuation or combinations thereof.

4. The method of claim 1, wherein the target area comprises a general vicinity, a point, a horizon or a region of interest in the subsurface of the earth.

5. The method of claim 1, wherein the potential seismic data acquisition region comprises any location on the earth model that may receive the propagated wavefields.

6. The method of claim 1, wherein the potential seismic data acquisition region comprises one or more locations of one or more synthetic receivers in the earth model.

7. The method of claim 1, wherein the target area comprises one or more locations of one or more synthetic sources are positioned in the earth model.

8. The method of claim 1, wherein the potential seismic data acquisition region comprises a surface of the earth, a borehole, on a seabed or combinations thereof.

9. The method of claim 1, wherein the wavefields are propagated using a forward modeling technique.

10. The method of claim 1, wherein the propagated wavefields are one-way, two-way, finite difference, finite element, spectral, pseudo spectral, phase shift methods or combinations thereof.

11. The method of claim 1, wherein the propagated wavefields model one or more acoustic, elastic and attenuation effects on the earth model.

12. The method of claim 1, wherein the specific directions comprise a take-off direction of the propagated wavefields, an arrival direction of the propagated wavefields, a reflection angle and an azimuth at the target area or combinations thereof.

13. The method of claim 1, wherein at least one of the specific directions is defined in terms of local dip and azimuth of a reflector in the target area, one or more angles of incident for one or more of the propagated wavefields reflected at the reflector or combinations thereof.

14. The method of claim 1, wherein decomposing the propagated wavefields comprises using a Gabor decomposition technique that separates the propagated wavefields into one or more Gabor modes.

15. The method of claim 14, wherein each Gabor mode corresponds to a directional vector that is associated with a vicinity around a point in the target area and a set of points at the potential seismic data acquisition region.

16. The method of claim 1, further comprising identifying one or more contributions of one or more synthetic source and receiver pairs to data in the illumination map.

17. The method of claim 16, further comprising normalizing one or more seismic images of the target area to compensate for one or more illumination effects based on the contributions.

18. A non-transitory computer-readable storage medium having stored thereon computer-executable instructions which, when executed by a computer, cause the computer to:
- receive an earth model representing one or more properties of the earth;
- receive a target area in the earth model;
- simulate a propagation of one or more wavefields from the target area, such that a portion of the propagated wavefields extends to a potential acquisition region in the earth model;
- decompose the simulated propagated wavefields into a plurality of beamlets separated according to specific directions;
- create an illumination map based on one or more of the plurality of beamlets, wherein the illumination map represents attributes of the one or more of the plurality of beamlets; and
- create a seismic survey design based on the attributes represented in the illumination map.

19. The non-transitory computer-readable storage medium of claim 18, wherein the target area comprises one or more locations of one or more synthetic receivers in the earth model.

20. The non-transitory computer-readable storage medium of claim 18, wherein the potential seismic data acquisition region comprises one or more locations of one or more synthetic sources in the earth model.

21. The method of claim 1, wherein the attributes comprise amplitude of synthetic seismic data, effectiveness of the target area with respect to propagating wavefields, energy to the target area, energy from the target area, a direction that a propagating wavefield carries energy, an amount of energy that a direction of the propagating wavefield carries, a direction that a propagating wavefield loses energy, a direction that the propagating wavefield's energy fails to reach the target area, or a combination thereof.

22. The method of claim 21, further comprising selecting a portion of the synthetic source and receiver pairs to generate an image of the target area based on the contributions.

23. The method of claim 1, wherein the illumination map excludes attributes from at least one other beamlet in the plurality of beamlets.

24. The method of claim 1, wherein simulating the propagation of the one or more wavefields comprises simulating the propagation of the wavefields from a synthetic source in the potential seismic data acquisition region to the target area and using reciprocity to simulate the reflected wavefields at the target area back to the potential seismic data acquisition region.

25. The method of claim 1, wherein simulating the propagation of the wavefields comprises simulating the propagation of the wavefields predominantly upwards from one or more synthetic sources in the target area.

* * * * *